United States Patent Office 3,121,661
Patented Feb. 18, 1964

3,121,661
METHOD OF KILLING NEMATODES WITH ESTERS OF AMINO-THIOSULFENIC ACIDS
Homer R. Williams, deceased, late of Modesto, Calif., by Matilda P. Williams, executrix, Modesto, Calif., assignor to Shell Oil Company, New York, N.Y., a corporation of Delaware
No Drawing. Filed Jan. 18, 1961, Ser. No. 83,355
8 Claims. (Cl. 167—22)

This invention relates to a new class of compounds which are of substantial interest and utility for the destruction of noxious organisms that inhabit soil. Generally speaking, the new compounds are the aliphatic hydrocarbon esters of secondary amino-thiosulfenic acids. These esters have been found to be effective killers of noxious soil-borne organisms, including nematodes and fungi.

The new esters can be described by the general formula:

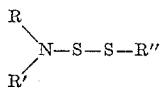

where R" represents the aliphatic hydrocarbon group, and R and R' represent the two organic moieties of the secondary amino group.

In these esters, the aliphatic hydrocarbon group R" suitably can be of straight-chain configuration, or it can be of branched-chain configuration, and can contain, for example, up to twenty carbon atoms, or even more. The group R" also can be cyclic in structure, and as used herein the term "aliphatic" is intended to include cycloaliphatic. The invention also comprehends the esters of polyalcohols, such as glycols, with secondary amino-thiosulfenic acids; these esters of course would have the general formula:

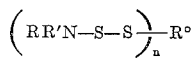

wherein R° is an aliphatic hydrocarbon radical of valence n. Suitably, the group R" (R°) can be saturated—that is, R" can be alkyl; R° can be alkylene—it can be mono- or poly-olefinically unsaturated—that is, R" can be alkenyl, alkadienyl, or the like; R° can be alkenylene, alkadienylene, or the like—or it can be acetylenically unsaturated—that is, R" can be alkynyl, or the like; R° can be alkynylene, or the like.

Within the terms of this invention either or both of the organic moieties, R and R', of the amino group can be aliphatic hydrocarbon as represented by R", or either or both can be aromatic, or mixed in character, and either or both can contain one or more non-hydrocarbon substituent groups. When aromatic, either or both can be mononuclear or polynuclear. By mixed character is meant the aliphatic groups substituted by one or \more aromatic groups and the aromatic groups substituted by one or more aliphatic groups. Preferred non-hydrocarbon substituent groups—because of the desirable properties of the resulting esters—are the halogens, particularly the middle holagens, bromine and chlorine, the nitro group, groups involving linking oxygen as in ether groups, and hydroxy groups, and the cyano group.

Suitably, R and R' together can represent a divalent radical—hydrocarbon or hetero—which together with the indicated nitrogen atom of the amino group can form a heterocyclic ring, as for example, a piperidine or a morpholine ring.

Of these new esters, the ones which presently show most promise as agricultural chemicals are those having low molecular weight, such as, for example, those wherein each R, R' and R" (or R°) contains not more than eight carbon atoms, those wherein each of R and R' is aliphatic hydrocarbon, mononuclear aromatic, or together with the indicated nitrogen atom form a six-membered hetero ring, being of apparently marked promise. Of particular interest because their very low phytotoxicity permits their use as pesticides for direct treatment of the roots of infested plants are the esters wherein each of R and R' is alkyl and R" is alkenyl (R° is alkenylene), the preferred alkenyl groups being those wherein the olefinic unsaturation is between the beta and gamma carbon atoms, relative to the indicated sulfur atom of the thiosulfenic acid.

The esters of this invention are exemplified by: the methyl ester of dimethylaminothiosulfenic acid, the isopropyl ester of N-methyl-N-ethylaminothiosulfenic acid, the allyl ester of dimethylaminothiosulfenic acid, the methyl ester of N-morpholinethiosulfenic acid, the crotyl ester of dimethylaminothiosulfenic acid, the cyclohexyl ester of dimethylaminothiosulfenic acid, the methyl ester of N-phenyl-N-methylaminothiosulfenic acid, the pentyl ester of diallylaminothiosulfenic acid, the pentyl ester of diallylaminothiosulfenic acid, the 3-pentenyl ester of N-benzyl-N-isopropylaminothiosulfenic acid, the methyl ester of N - (p-chlorophenyl)-N-methylaminothiosulfenic acid, and the like.

The esters of this invention are readily and conveniently prepared by reacting the appropriate secondary aminosulfenylhalide, preferably the chloride, with about the stoichiometric amount of the alkali metal, preferably sodium, derivative of the appropriate aliphatic hydrocarbon mercaptan—that is, with the alkali metal mercaptide. In some cases, it may be found desirable to insure complete reaction to employ a slight to moderate excess—for example, a 10% to 100% excess—of one or the other of the two reactants. It usually will be found desirable to employ an inert solvent to provide a readily fluid reaction mixture. Suitable solvents in some cases will be the non-acidic oxygen-containing organic liquids, such as alcohols, ethers, ketones and esters. The lower alkanols, particularly methanol and ethanol, are preferred in such cases. In other cases, liquid hydrocarbons will be found most useful as the solvent, aliphatic hydrocarbons being most effective in some cases, while aromatic hydrocarbons will be most effective in other cases. The reaction is ordinarily first conducted at a temperature below about 0° C.—for example, at temperatures of from 0° C. to −25° C. Recovery of the ester is ordinarily most effective contacting the reaction mixture with water, then recovering the ester from the organic phase by the usual methods known to the art, distillation, crystallization and extraction techniques being most useful.

*Example I*

A solution of sodium methyl mercaptide in methanol was prepared by adding a solution of sodium methylate in methanol to a solution of methyl mercaptan in methanol at −30° C. 275 milliliters of this solution contained 0.8 mole of the mercaptide. 80 milliliters of dimethylaminosulfenyl chloride was added, with stirring and cooling to maintain the temperature of the mixture below 20° C. The resulting mixture then was poured into twice its volume of water, and the lower phase was separated. The upper, aqueous, phase was extracted with ether, and the ether extract was combined with the separated lower phase. The resulting mixture was evaporated on a steam bath, and the residue was distilled under reduced pressure to give 13 grams of the methyl ester of dimethylaminothiosulfenic acid, boiling at 74–77° C. at 65 millimeters mercury pressure. The identity of the ester was confirmed by elemental analysis, and by infrared spectrum analysis.

*Example II*

To 15.4 grams of sodium methyl mercaptide dissolved in 57 grams of methanol at −10° C. with stirring there was added 31 grams of N-piperidinesulfenyl chloride over a period of one-half hour. The resulting mixture was poured into 500 milliliters of water and the two layers were separated. The aqueous layer was extracted once with chloroform and the chloroform was evaporated. The residue was added to the organic layer and the mixture was distilled. The product, the methyl ester of N-piperindinethiosulfenic acid, was distilled at 55–60° C. at 0.25–0.30 millimeter mercury pressure. The identity of the ester was confirmed by elemental analysis.

*Example III*

In the manner set out in Example II, sodium methyl mercaptide was reacted with N-morpholinesulfenyl chloride to form the methyl ester of N-morpholinethiosulfenic acid.

*Example IV*

50 grams of freshly distilled allyl mercaptan was added to a solution of 39 grams of sodium methoxide in 200 milliliters of ethanol at 25° C. The resulting slurry was cooled to −10° C. and 83 grams of dimethylaminosulfenyl chloride was added dropwise with stirring, the mixture temperature being maintained at −10° C. Water and ether were added to the resulting mixture. The ether layer was separated, washed with water, dried and concentrated under vacuum. A fraction boiling at 40–45° C. under 0.1 millimeter mercury pressure was obtained. This fraction then was redistilled to give the allyl ester of dimethylaminothiosulfenic acid, boiling at 57–58° C. under 7 millimeters mercury pressure. The identity of the product was confirmed by elemental analysis.

*Example V*

In the manner set out in Example II, the sodium derivative of ethoxycarbonylmethyl mercaptan was reacted with morpholinesulfenyl chloride to form the ethoxycarbonylmethyl ester of morpholinethiosulfenic acid.

*Example VI*

39 grams of 2-methylallyl thiolacetate was added slowly to a solution of 17 grams of sodium methoxide in 50 milliliters of methanol. The resulting mixture was diluted with 100 milliliters of toluene and refluxed with removal of the methanol and the methyl acetate formed. The mixture was cooled to −5° C. and 33.5 grams of dimethylaminosulfenyl chloride was added slowly with cooling to maintain the mixture at −5° C. After addition of the chloride was complete, water was added and the toluene layer was removed, dried and concentrated by distillation. The 2-methylallyl ester of dimethylaminothiosulfenic acid was recovered as a fraction boiling at 109–114° C. at 20 millimeters mercury pressure. The identity of the ester was confirmed by elemental analysis.

*Example VII*

In the manner set out in Example IV, allyl mercaptan was converted to the sodium derivative, which was reacted with diethylaminosulfenyl chloride to form the allyl ester of diethylaminothiosulfenic acid, boiling at 55–60° C. at 0.8 millimeter mercury pressure.

*Example VIII*

In the manner set out in Example I, sodium methyl mercaptide was reacted with diethylaminosulfenyl chloride to form the methyl ester of diethylaminothiosulfenic acid, boiling at 74–77° C. at 65 millimeters mercury pressure.

Esters of this invention have been found to be effective killers of soil-borne phytopathogenic organisms, such as nematodes, and such microorganisms as fungi, some of the esters, at least, having such low phytotoxicity that they may be employed to destroy phytopathogenic organisms which are attacking the roots of living plants.

As examples of the nematodes which these esters control, there may be mentioned the cyst-forming nematodes of the genus Heterodera, the root knot nematodes of the genus Meloidogyne, the root-lesion nematodes of the genus Pratylenchus and the citrus nematodes of the genus Tylenchulus, the sting nematodes of the genus Belonolaimus, and the plant-parasitic nematodes of such genera as Ditylenchus, Nacobbus and the like.

As examples of the fungi which these esters control, there are the phytopathogenic fungi of the genera, Phytophthora, Verticillium, Armillaria, Alternaria, Fusarium, Pythium, Rhizoctonia, Sclerotium, Cytospora, Ceratostomella, Rosellinia (as in the Dematophora state of *Rosellinia necatrix*), Helminthosporium and the like.

These esters are employed for the destruction of nematodes and fungi in soil by the usual methods of the art—that is, the active material is intimately disseminated in the soil to be treated to provide the necessary concentration of the active material in that soil. In the case of the present esters, and judging by the experimental work which has been performed, the necessary concentration of the ester lies within the range of from about 20 to about 1000 parts per million, on a weight basis based on the weight of the air-dry soil, with the usual dosage ranging from about 50 parts per million to about 750 parts per million, on the same basis. While one or more of the esters may be applied neat, in most cases it will probably be most effectively disseminated uniformly in the soil by means of an inert carrier. Liquid compositions containing the ester or esters may be prepared by dissolving or dispersing the ester(s) in a suitable organic diluent, such as acetone, various hydrocarbons which are commonly employed for such purpose, water or the like. If desired, suitable emulsifying and/or dispersing agents can be added. Dissemination of the composition into the soil can be effected in any convenient manner—i.e., by simple mixing of the soil and composition, by injection of the composition into the soil, by drenching the surface of the soil with the composition, with or without subsequent tilling of the soil, by including the active ester(s) in irrigation water, by injection into seed beds, by application into furrows into which seeds will be planted, or the like. If desired, the ester(s) can be made up in the form of solid compositions—dusts, granules or the like—for application to the soil. An excellent summary of current practice in the use and application of chemicals to kill soil-borne nematocides and/or fungi is given in United States Patent No. 2,840,501, issued June 24, 1958. The composition containing the ester or esters can also contain other materials, such as insecticides, hormones, or fertilizers, to form multipurpose compositions.

The effectiveness of esters of the invention as nematocides for destroying soil-borne nematodes has been demonstrated by the following tests performed on typical species of these esters.

One-gallon jars were filled with soil heavily infested with the root-knot nematode, *Meloidogyne incognita* (var. *acrita*). To one jar of a pair, the test material was added and thoroughly mixed with the soil in a dosage of 0.16 milliliter; the other jar of each pair was used as a blank. The jars then were stored for one week at 80° F. The soil was then transferred from each of the jars into four 4-inch clay pots and the pots were seeded with tomatoes. After six weeks, the soil was washed from the roots of the plants and the amount of damage caused by the nematodes was visually ascertained by experienced observers. It was found that under these conditions both the methyl ester of N-piperidinethiosulfenic acid and the methyl ester of N-morpholinethiosulfenic acid destroyed from 80 to 100 percent of the nematodes.

The effectiveness of esters of the invention as soil fungicides has been demonstrated by the following tests performed on typical species of these esters.

In these tests, screened sandy loam soil infested with the indicated organisms was thoroughly mixed with the chemical to be tested, the dosage being one gram of chemical per gallon of soil, or, equivalently, 200 parts per million, weight basis based on weight of air-dry soil. Seeds of the test plants then were sown in the soil, and after an appropriate interval the soil was washed from the roots of the plants and the amount of damage caused by the organisms determined visually by experienced observers. It was found that under these conditions the methyl ester of N-piperidinethiosulfenic acid and the methyl ester of N-morpholinethiosulfenic acid both gave substantially complete control of bean root rot (Thielaviopsis-Rhizoctonia complex), pea root rot (Fusarium-Rhizoctonia complex), cotton root rot (Fusarium-Rhizoctonia complex) and sugar beet damping-off organism (Pythium) without damage to the test plants. It was also found that the allyl ester of dimethylaminothiosulfenic acid destroyed *Sclerotium rolfsii*, and was effective against bean, pea and cotton root rots. In the same tests the allyl ester of diethylaminothiosulfenic acid was found to be fungicidally active.

At least some of the esters of this invention also may be used to destroy noxious organisms which are attacking the roots of living plants. This fact is demonstrated by the results of the following tests performed on typical species of these esters.

Tomato plants were grown under uniform conditions in soil infested with nematodes, primarily *Meloidogyne incognita* (var. *acrita*). The infested plants then were removed from the soil and washed thoroughly, and for 24 hours each plant was soaked in an aqueous liquid composition containing the test chemical, then was removed, the roots were rinsed with water and the plant was planted in clean soil. About a month later, the plants were harvested and examined for any new infection and to determine if any damage had been done to the plant by the treatment. The observations were made, and the extent of control of the nematodes was estimated by experienced observers. It was found that both the methyl ester of N-piperidinethiosulfenic acid and the methyl ester of N-morpholinethiosulfenic acid gave approximately 93% control of the nematodes at a concentration of 250 parts per million, by weight of the solution, without damage to the plants, and the experimental data indicates that slightly higher concentration of the ester would have given substantially complete control of the nematodes without injury to the plants. It was found that the allyl ester of dimethylaminothiosulfenic acid was even more active, giving approximately 96% control of the nematodes at the 250 parts per million concentration without injury to the test plants.

It is accordingly evident that esters of this invention effectively destroy nematodes attacking plant roots without damage to the plants. The esters also are capable of destroying fungi attacking the roots of plants. These abilities of the esters are exploited by wetting the roots of the plants with a liquid composition containing the pesticidally effective but nonphytotoxic concentration of at least one of the esters, then planting the treated plant, or preparing it for shipping and later planting. Ordinarily, the contact of the surface of the roots of the plant with the pesticide composition will be most conveniently and effectively attained by immersing the roots, preferably freed from at least most of the soil in which they are growing, in a mass of the composition so that the surfaces of the roots are thoroughly wetted by the composition. The roots then can be withdrawn from the mass of the composition and the plant planted. If desired, the plant's roots may be rinsed with water after the plant is removed from contact with the liquid composition, or the plant may be planted without any intervening rinse.

It has been found that when plants which have been treated according to the method of this invention are planted in clean soil free from noxious organisms, a substantial improvement in growth occurs—as compared to plants infested with nematodes and/or noxious fungi planted in the same kind of clean soil.

These pesticidal agents ordinarily are used in the form of an aqueous solution and/or suspension of appropriate strength, since the solution will be directly applied to the roots of the plant and since water is a solvent which will not injure the roots. Other solvents may be present or may be used, as desirable and convenient, but in all cases, care must be taken to insure that the solvent is one which is not phytotoxic.

In general, suitable solvents other than water are the essentially neutral oxygen-containing organic liquids, such as the alcohols, ketones and esters. In many cases, it will be found that ester will be more soluble in a mixture of a lower alcohol or ketone and water than in water alone, so that the use of such mixtures will be advantageous. As a general matter, liquid hydrocarbons are not suitable because the solutions and/or suspensions made up from them tend to be unduly phytotoxic.

Likewise, other materials may be present in the liquid composition, provided that they do not injure the plant roots. Thus, surface-active agents—emulsifiers, detergents or the like—may be added, or hormones, fertilizers, or other special purpose chemicals may be included to provide multi-purpose compositions.

The concentration of a particular one or ones of the esters to be used in the liquid composition employed to treat any given species of plant will depend upon several factors: the ester or esters used, the species of plant used—particularly from the standpoint of the character of its roots, which is to say, whether its roots are smooth or rough, flesh or fibrous, tender or woody, the extent to which they have been modified by attack by the nematodes and microorganisms and the nature of those modifications—and the character of the organisms to be destroyed. The esters of this invention are effective fungicides and nematicides in some cases at concentrations of as little as 10 parts per million by weight of the composition. In the usual case, it will be found that a concentration in excess of about 800 parts per million by weight of the composition will not be required and therefore concentrations above this level preferably are not used. It will be appreciated that as in the case of any chemical which exhibits biocidal activity, injury to the roots of the plants can occur if a concentrated solution or suspension of a pesticide of the method of this invention is applied to those roots. The concentrations set out herein are those which the experimental evidence available show are effective pesticidal dosages which are not phytotoxic. Usually, a concentration of the pesticide of from about 10 to about 600 parts per million by weight of the composition will be found best, since at these concentrations both nematodes and fungi are effectively destroyed and possibility of injury to the plant by the pesticide is minimized.

The plants are ordinarily most conveniently and effectively treated by simply contacting their roots with the liquid pesticide composition, and allowing them to remain in contact with the composition for the time required to effect destruction of the undesired organisms on the roots. The contact can be effected by drenching the soil surrounding the roots with the pesticide composition to wet the roots thoroughly with that composition. However, usually it will be found most convenient and effective to remove at least the major part of the soil surrounding the roots before those roots are contacted with the pesticide composition. In this case, the infested plant is carefully removed from the soil, its roots immersed in the pesticide composition for the necessary time, then it is removed from contact with the composition and replanted, or prepared for shipment. In many cases it will be found preferable to rinse most of the soil from the roots of the plant before it is treated—i.e., the "bare root" plant is treated. Where the plant is to be packed for sale in "bare-root" condition, this technique is particularly convenient. In some cases, a contact period of as little as a few minutes—for example, 15 to 60 minutes—will be sufficient, while in other cases, primarily where access to the organisms by the pesticide is difficult to obtain, as much as 36 to 48 hours contact time may be required. Ordinarily a contact time of from about 8 to about 24 hours will be sufficient. In some cases, it may be found convenient and/or desirable to immerse the entire plant in the pesticidal composition. This particular technique may be used to destroy noxious microorganisms present on the stems and leaves of the plant as well as on its roots.

Where the roots of the infested plants are immersed in a mass of the pesticide composition, the composition from which the plants have been removed may be reused, provided that the concentration of pesticide therein is sufficiently high, or provided that additional pesticide is added to attain the necessary concentration.

After removal from the pesticide composition, the plants may be planted, or packaged for shipment, without further treatment, or the roots of the plants may first be rinsed with water or other appropriate solvent to remove any excess of the pesticide composition remaining on the roots.

What is claimed is:

1. A method for killing nematodes which comprises bringing the live nematodes into contact with an effective amount of a compound of the formula

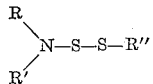

wherein R° is aliphatic hydrocarbon of up to eight carbon atoms, and R and R' each contain up to eight carbon atoms, and are independently selected from the group consisting of aliphatic hydrocarbon, aromatic hydrocarbon, araliphatic hydrocarbon, aliphatic-substituted aromatic hydrocarbon and such hydrocarbon groups substituted by at least one member of the group consisting of bromine, chlorine, cyano, hydroxy and nitro, with the proviso that R and R' together can represent a member of the group consisting of —(CH$_2$)$_5$— and

—(CH$_2$)$_2$—O—(CH$_2$)$_2$— which together with the indicated nitrogen atom forms a hetero ring of the group consisting of piperidino and morpholino, respectively, and $n$ represents an integer from 1 to 2.

2. A method for killing nematodes which comprises bringing the live nematodes into contact with an effective amount of a compound of the formula

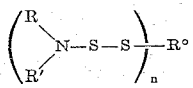

wherein R and R' each independently represents alkyl of up to eight carbon atoms and R'' is alkenyl of up to eight carbon atoms.

3. A method according to claim 2 wherein the olefinic unsaturation in the alkenyl group is between the beta and gamma carbon atoms thereof relative to the indicated sulfur atom.

4. A method according to claim 3 wherein the alkenyl group is the allyl group.

5. A method for killing nematodes which comprises bringing the live nematodes into contact with an effective amount of the allyl ester of dimethylaminothiosulfenic acid.

6. A method for protecting living plants from nematodes attacking the roots of the plants, said method comprising contacting the nematodes on the roots of said plants with a dosage of which is toxic to said nematodes but substantially nontoxic to the said roots of a compound of the formula

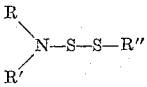

wherein R and R' each independently represents alkyl of up to eight carbon atoms and R'' is alkenyl of up to eight carbon atoms.

7. A method according to claim 6 wherein the olefinic unsaturation in the alkenyl group is between the beta and gamma carbon thereof relative to the indicated sulfur atom.

8. A method for protecting living plants from nematodes attacking the roots of the plants, said method comprising contacting the nematodes on the roots of said plants with a dosage which is toxic to said nematodes but substantially nontoxic to the said roots of the allyl ester of dimethyl aminothiosulfenic acid.

References Cited in the file of this patent

UNITED STATES PATENTS

| | | |
|---|---|---|
| 2,520,401 | Himel et al. | Aug. 29, 1950 |
| 2,807,615 | Himel | Sept. 24, 1957 |
| 2,868,633 | Goodhue | Jan. 13, 1959 |
| 2,886,593 | Louthan et al. | May 12, 1959 |
| 2,898,205 | Pyne et al. | Aug. 4, 1959 |
| 2,914,392 | D'Amico | Nov. 24, 1959 |
| 2,927,131 | Louthan | Mar. 1, 1960 |